United States Patent
Horiuchi et al.

(10) Patent No.: US 10,593,447 B2
(45) Date of Patent: Mar. 17, 2020

(54) PERMANENT MAGNET, AND MOTOR AND POWER GENERATOR USING THE SAME

(71) Applicant: KABUSHIKI KAISHA TOSHIBA, Minato-ku, Tokyo (JP)

(72) Inventors: Yosuke Horiuchi, Tokyo (JP); Shinya Sakurada, Tokyo (JP); Keiko Okamoto, Kanagawa-ken (JP); Masaya Hagiwara, Kanagawa-ken (JP); Tsuyoshi Kobayashi, Kanagawa-ken (JP); Masaki Endo, Tokyo (JP); Tadahiko Kobayashi, Kanagawa-ken (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 379 days.

(21) Appl. No.: 14/068,075

(22) Filed: Oct. 31, 2013

(65) Prior Publication Data

US 2014/0139063 A1 May 22, 2014

(30) Foreign Application Priority Data

Nov. 20, 2012 (JP) .................. 2012-254127

(51) Int. Cl.
H01F 1/01 (2006.01)
H01F 1/055 (2006.01)
(Continued)

(52) U.S. Cl.
CPC ............. *H01F 1/01* (2013.01); *C22C 38/005* (2013.01); *H01F 1/0557* (2013.01); *H02K 1/02* (2013.01)

(58) Field of Classification Search
None
See application file for complete search history.

(56) References Cited

U.S. PATENT DOCUMENTS

| 4,746,378 A | 5/1988 | Wysiekierski et al. |
| 2011/0076311 A1 | 3/2011 | Serizawa et al. |

(Continued)

FOREIGN PATENT DOCUMENTS

| EP | 0156483 A1 | 10/1985 |
| JP | 06-212327 | 8/1994 |

(Continued)

OTHER PUBLICATIONS

T. S. Chin, W. C. Chang, R. T. Chang, M. P. Hung, H. T. Lee. "Effect of the variation in Sm/Cu/Zr content on phase stability of a Sm(Co,Fe,Cu,Zr)7.4 permanent magnet alloy." IEEE Transactions on Magnetics, vol. 25, No. 5, Sep. 1989 pp. 3782-3784.*

(Continued)

*Primary Examiner* — Paul A Wartalowicz
*Assistant Examiner* — Stephani Hill
(74) *Attorney, Agent, or Firm* — Amin, Turocy & Watson, LLP

(57) ABSTRACT

In one embodiment, a permanent magnet includes a sintered compact including: a composition expressed by a composition formula: $R_p Fe_q M_r Cu_s Co_{100-p-q-r-s}$ (R is at least one element selected from rare-earth elements, M is at least one element selected from Zr, Ti, and Hf, $10 \leq p \leq 13.3$ at %, $25 \leq q \leq 40$ at %, $0.87 \leq r \leq 5.4$ at %, and $3.5 \leq s \leq 13.5$ at %); and a metallic structure having a main phase including a $Th_2Zn_{17}$ crystal phase, and an R-M-rich phase containing the element R whose concentration is 1.2 times or more an R concentration in the main phase and the element M whose concentration is 1.2 times or more an M concentration in the main phase. A volume fraction of the R-M-rich phase in the metallic structure is from 0.2% to 15%.

6 Claims, 5 Drawing Sheets

(51) Int. Cl.
*H02K 1/02* (2006.01)
*C22C 38/00* (2006.01)

(56) References Cited

U.S. PATENT DOCUMENTS

| | | |
|---|---|---|
| 2011/0241810 A1 | 10/2011 | Horiuchi et al. |
| 2011/0278976 A1 | 11/2011 | Horiuchi et al. |
| 2012/0242180 A1 | 9/2012 | Horiuchi et al. |
| 2014/0062630 A1 | 3/2014 | Horiuchi et al. |

FOREIGN PATENT DOCUMENTS

| | | | |
|---|---|---|---|
| JP | 09-111383 | 4/1997 | |
| JP | 2003133116 A * | 5/2003 | ........... H01F 1/0557 |
| JP | 2010-034522 | 2/2010 | |
| JP | 2010-123722 | 6/2010 | |
| JP | 2011-216716 | 10/2011 | |
| JP | 2012-204599 | 10/2012 | |
| WO | 2009/145299 | 12/2009 | |
| WO | 2010058555 A1 | 5/2010 | |

OTHER PUBLICATIONS

ASTM E 562-11 Standard Test Method for Determining Volume Fraction by Systematic Manual Point Count.*
L. Rabenberg, R. K. Mishra, G. Thomas. "Microstructures of precipitation-hardened SmCo permanent magnets." J. Appl. Phys. 53 (3), Mar. 1982, pp. 2389-2391.*
M. Faisal. C. Jiang. J Supercond Nov Magn (2011) 24: 779-783.*
JP 2003-133116 machine translation.*
Chinese Office Action for Chinese Patent Application No. 201310585387.7 dated Oct. 30, 2015.
C. Maury, et al. "Genesis of the Cell Microstructure in the Sm (Co, Fe, Cu, Zr) Permanent Magnets with 2:17 Type", phys, stat sol. (a) 140, 1993, pp. 57-72.
European Search Report for Application No. 13192126.4-1556 dated Apr. 2, 2014, 7 pgs.
Maury, et al "Genesis of the cell microstructure in the Sm(Co, Fe, Cu, Zr) permanent magnets with 2:17 Type", Physica Status Solidi (A), vol. 140, No. 1, Nov. 16, 1993, pp. 57-72, XP055108686.
Extended European Search Report for European Patent Application No. 15168875.1-1556 dated Oct. 12, 2015, 7 pages.
Chinese Office Action for Chinese Patent Application No. 201310585387.7 dated Jun. 30, 2016.
Jianhong, et al. "Aging Treatment and Magnetic Properties for the 2:17 Type SmCo Permanent Magnets of High Coercivity", Rare Metal Materials and Engineering, vol. 32, No. 10, pp. 836-839, Oct. 2003.
Li Li-ya, et al. "Microstructure and Coercivity Mechanism of Sm2Co17 type High Temperature Rare-Earth Permanent Magnets", The Chinese Journal of Nonferrous Metals, vol. 18, No. 1, pp. 72-77, Jan. 2008.
Corfield, et al. "Study of solid-state reactions in Sm (Co, Fe, Cu, Zr)z 2:17-type alloys by means of in situ electrical resistivity measurements", Journal of Magnetism and Magnetic Materials 316, 2007, pp. 59-66.
Japanese Office Action for Japanese Patent Application No. 2012-254127 dated Aug. 9, 2016.
Japanese Notice of Allowance for Japanese Patent Application No. 2012-254127 dated Dec. 13, 2016.

* cited by examiner

MAIN PHASE ($Th_2Zn_{17}$ PHASE)
HETERO PHASE A
HETERO PHASE B
HETERO PHASE C (Sm-Zr-RICH PHASE)

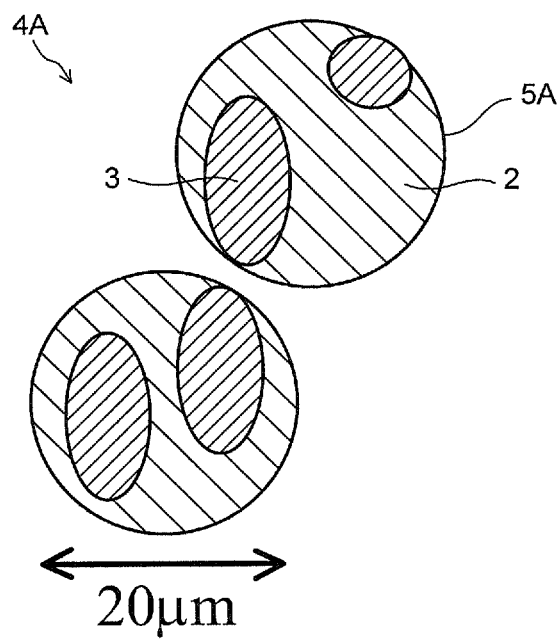
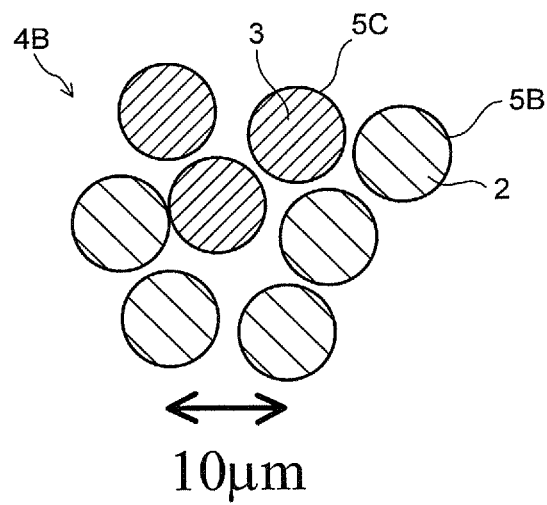

PERMANENT MAGNET, AND MOTOR AND POWER GENERATOR USING THE SAME

CROSS REFERENCE TO RELATED APPLICATION

This application is based upon and claims the benefit of priority from Japanese Patent Application No. 2012-254127, filed on Nov. 20, 2012; the entire contents of which are incorporated herein by reference.

FIELD

Embodiments disclosed herein relate generally to a permanent magnet, and a motor and a power generator using the same.

BACKGROUND

As a high-performance permanent magnet, there have been known rare-earth magnets such as a Sm—Co-based magnet and a Nd—Fe—B-based magnet. When a permanent magnet is used for a motor of a hybrid electric vehicle (HEV) or an electric vehicle (EV), the permanent magnet is required to have heat resistance. In a motor for HEV or EV, a permanent magnet whose heat resistance is enhanced by substituting a part of Nd (neodymium) in the Nd—Fe—B-based magnet with Dy (dysprosium) is used. Since Dy is one of rare elements, there is a demand for a permanent magnet not using Dy. The Sm—Co-based magnet has high Curie temperature, and it is known that the Sm—Co-based magnet exhibits excellent heat resistance with a composition system not using Dy. The Sm—Co-based magnet is expected to realize a good operating characteristic at high temperatures.

The Sm—Co-based magnet is lower in magnetization compared with the Nd—Fe—B-based magnet, and cannot realize a sufficient value of the maximum energy product ($(BH)_{max}$). In order to increase the magnetization of the Sm—Co-based magnet, it is effective to substitute a part of Co with Fe, and to increase an Fe concentration. However, in a composition range having a high Fe concentration, a coercive force of the Sm—Co-based magnet tends to reduce. Further, the Sm—Co-based magnet is made of a fragile intermetallic compound, and is generally used as a sintered magnet. Therefore, brittleness of the Sm—Co based magnet is liable to be a problem in view of fatigue characteristics. In the Sm—Co based sintered magnet having a composition with a high Fe concentration, enhancement in mechanical properties such as strength and toughness in addition to improvement in a magnetic property such as a coercive force is required.

BRIEF DESCRIPTION OF THE DRAWINGS

FIG. 3 is a cross-sectional view schematically showing a metallic structure of alloy particles obtained by grounding the alloy ingot shown in FIG. 2 so that a particle size becomes about 20 μm.

FIG. 4 is a cross-sectional view schematically showing a metallic structure of alloy particles obtained by grounding the alloy ingot shown in FIG. 2 so that a particle size becomes about 10 μm or less.

DETAILED DESCRIPTION

Figure 1:
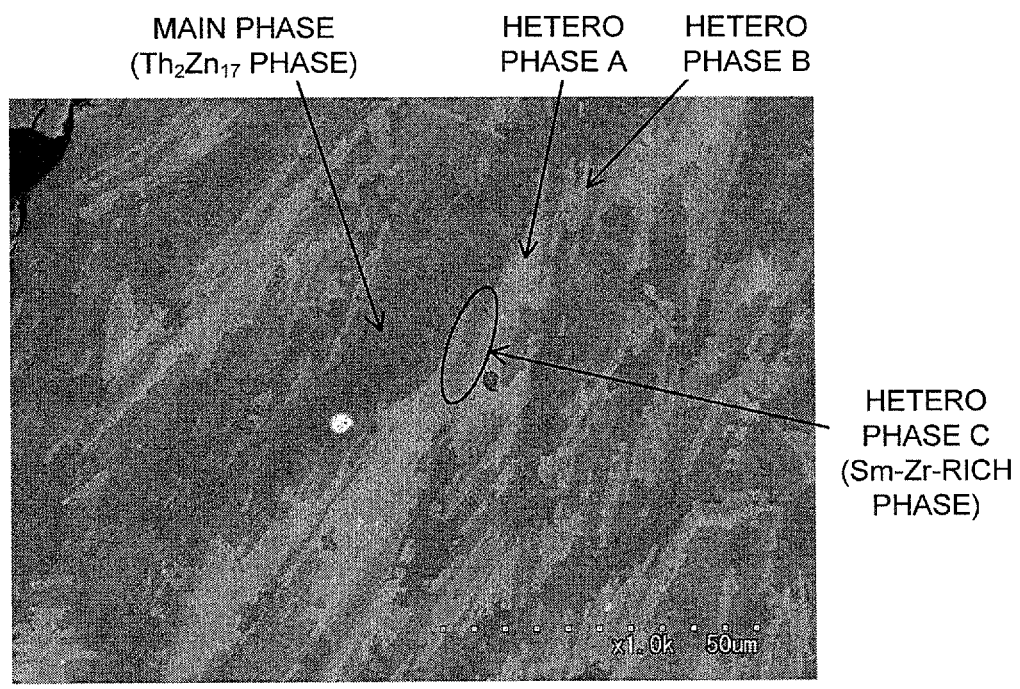
FIG. 1 is an enlarged SEM-reflected electron image showing a metallic structure of an alloy ingot used for fabricating a Sm—Co based sintered magnet.

According to one embodiment, there is provided a permanent magnet including a sintered compact having a composition expressed by a composition formula:

$$R_p Fe_q M_r Cu_s Co_{100-p-q-r-s} \quad (1),$$

wherein R is at least one element selected from the group consisting of rare-earth elements, M is at least one element selected from the group consisting of Zr, Ti, p is a number satisfying $10 \leq p \leq 13.3$ at %, q is a number satisfying $25 \leq q \leq 40$ at %, r is a number satisfying $0.87 \leq r \leq 5.4$ at %, and s is a number satisfying $3.5 \leq s \leq 13.5$ at %. The sintered compact includes a metallic structure having a main phase including a $Th_2Zn_{17}$ crystal phase and containing the element R and the element M, and an R-M-rich phase containing the element R whose concentration is 1.2 times or more an R concentration in the main phase and the element M whose concentration is 1.2 times or more an M concentration in the main phase. A volume fraction of the R-M-rich phase in the metallic structure is 0.2% or more and 15% or less.

Hereinafter, the permanent magnet of the embodiment will be described in detail. In the composition formula (1), as the element R, at least one element selected from the rare-earth elements containing yttrium (Y) is used. Any of the elements R brings about great magnetic anisotropy and imparts a high coercive force to the permanent magnet. As the element R, at least one selected from samarium (Sm), cerium (Ce), neodymium (Nd), and praseodymium (Pr) is preferably used, and the use of Sm is especially desirable. When 50 at % or more of the element R is Sm, performance of the permanent magnet, in particular, its coercive force can be increased with high reproducibility. Further, 70 at % or more of the element R is desirably Sm.

The content p of the element R is in a range of from 10 at % to 13.3 at %. When the content p of the element R is less than 10 at %, a large amount of an α-Fe phase precipitates, so that a sufficient coercive force cannot be obtained. When the content p of the element R is over 13.3 at %, saturation magnetization greatly lowers. The content p of the element R is preferably in a range of from 10.2 at % to 13 at %, and more preferably in a range of from 10.5 at % to 12.5 at %.

Iron (Fe) is an element mainly responsible for magnetization of the permanent magnet. When a relatively large amount of Fe is contained, the saturation magnetization of the permanent magnet can be increased. However, when too large an amount of Fe is contained, the α-Fe phase precipitates and a later-described desired two-phase separation structure cannot be obtained, which is liable to lower the coercive force. Therefore, the content q of Fe is in a range of from 25 at % to than 40 at %. The content q of Fe is preferably in a range of from 27 at % to 38 at %, and more preferably in a range of from 30 at % to 36 at %.

As the element M, at least one element selected from titanium (Ti), zirconium (Zr), and hafnium (Hf) is used. Compounding the element M makes it possible for a large coercive force to be exhibited in a composition with a high Fe concentration. The content r of the element M is in a range of from 0.87 at % to 5.4 at %. By setting the content r of the element M to 0.87 at % or more, it is possible to increase the Fe concentration. When the content r of the element M is over 5.4 at %, the magnetization greatly lowers. The content r of the element M is preferably in a range of from 1.3 at % to 4.3 at %, and more preferably in a range of from 1.5 at % to 2.9 at %.

The element M may be any of Ti, Zr, and Hf, but at least Zr is preferably contained. In particular, when 50 at % or more of the element M is Zr, it is possible to further improve the effect of increasing the coercive force of the permanent magnet. On the other hand, since Hf is especially expensive among the elements M, an amount of Hf used, when it is used, is preferably small. A content of Hf is preferably less than 20 at % of the element M.

Copper (Cu) is an element for making the permanent magnet exhibit a high coercive force. The compounding amount s of Cu is in a range of from 3.5 at % to 13.5 at %. When the compounding amount s of Cu is less than 3.5 at %, it is difficult to obtain a high coercive force. When the compounding amount s of Cu is over 13.5 at %, the magnetization greatly lowers. The compounding amount s of Cu is preferably in a range of from 3.9 at % to 9 at %, and more preferably in a range of from 4.2 at % to 7.2 at %.

Cobalt (Co) is an element not only responsible for the magnetization of the permanent magnet but also necessary for a high coercive force to be exhibited. Further, when a large amount of Co is contained, a Curie temperature becomes high, resulting in an improvement in thermal stability of the permanent magnet. When the content of Co is too low, it is not possible to obtain these effects sufficiently. However, when the content of Co is too high, a content ratio of Fe relatively lowers and the magnetization lowers. Therefore, the content of Co is set so that the content of Fe satisfies the aforesaid range, in consideration of the contents of the element R, the element M, and Cu.

Part of Co may be substituted for by at least one element A selected from nickel (Ni), vanadium (V), chromium (Cr), manganese (Mn), aluminum (Al), gallium (Ga), niobium (Nb), tantalum (Ta), and tungsten (W). These substitution elements A contribute to improvement in properties of the magnet, for example, the coercive force. However, since the excessive substitution by the element A for Co is liable to lower the magnetization, an amount of the substitution by the element A is preferably 20 at % or less of Co.

The permanent magnet of the embodiment includes a sintered magnet made of the sintered compact having the composition expressed by the composition formula (1). The sintered magnet (sintered compact) has, as the main phase, a region including the $Th_2Zn_{17}$ crystal phase. The main phase contains the element R, Fe and Co, and further contains the element M and Cu. The main phase of the sintered magnet refers to a phase whose area ratio in an observed image (SEM image) when a cross section or the like of the sintered compact is observed by a SEM (Scanning Electron Microscope) is the largest. The main phase of the sintered magnet preferably has a phase separation structure formed by applying aging a $TbCu_7$ crystal phase (1-7 phase) being a high-temperature phase as a precursor. The phase separation structure has a cell phase made of the $Th_2Zn_{17}$ crystal phase (2-17 phase) and a cell wall phase made of a $CaCu_5$ crystal phase (1-5 phase) and the like. Since domain wall energy of the cell wall phase is larger than that of the cell phase, a difference in this domain wall energy becomes a barrier to domain wall displacement. That is, it is thought that the coercive force of a domain wall pinning type is exhibited because the cell wall phase having the large domain wall energy works as a pinning site.

In the Sm—Co-based sintered magnet, the metallic structure (structure of the sintered compact) observed by SEM or the like has, as a hetero phase other than the main phase, the R-M-rich phase containing the element R whose concentration is 1.2 times or more the R concentration (concentration of the element R) in the main phase and the element M whose concentration is 1.2 times or more the M concentration (concentration of the element M) in the main phase. The R-M-rich phase lowers the concentration of the M element in the main phase and accordingly becomes a cause to hinder the phase separation of the main phase. Further, it becomes a cause to lower the magnetic property obtained by the phase separation of the main phase. Therefore, in view of the magnetic property of the Sm—Co-based sintered magnet, it is preferable to suppress the precipitation of the R-M-rich phase. However, by controlling a precipitation amount (abundance amount) of the R-M-rich phase to an appropriate value, it is possible to improve a mechanical property such as deflective strength of the Sm—Co-based sintered magnet while suppressing the adverse effect given to the magnetic property.

The sintered magnet of the embodiment includes the metallic structure (structure of the sintered compact) having the main phase including the $Th_2Zn_{17}$ crystal phase, and the R-M-rich phase containing the element R whose concentration is 1.2 times or more the R concentration in the main phase and the element M whose concentration is 1.2 times or more the M concentration in the main phase. The volume fraction of the R-M-rich phase in the metallic structure is controlled to the range of from 0.2% to 15%. When the volume fraction of the R-M-rich phase is 15% or less, the R-M-rich phase tends to exist in grain boundaries (crystal grain boundaries) of crystal grains forming the sintered compact. That is, the R-M-rich phase tends to exist in grain boundaries of crystal grains each mainly made of the main phase. This suppresses the hindrance to the phase separation of the main phase and the deterioration of the magnetic property. It is possible to improve the coercive force and the magnetization of the Sm—Co-based sintered magnet. Details will be described later.

An appropriate amount of the R-M-rich phase existing in the crystal grain boundaries of the sintered compact also contributes to improvement in the strength of the sintered compact. Specifically, an alloy forming the Sm—Co based sintered magnet is made of a fragile intermetallic compound, and in the sintered compact of such an alloy, its strength property in particular is likely to deteriorate. A possible cause to deteriorate the strength of the sintered magnet is that plastic deformation does not easily occur in the intermetallic compound. Therefore, when a stress is applied, breakage occurs in the crystal grain boundaries. In order to prevent such breakage ascribable to the stress application, it is effective to increase a yield stress of the alloy. Regarding this, making an appropriate amount of the R-M-rich phase exist in the crystal grain boundaries of the sintered compact improves the strength of the crystal grain boundaries themselves, which makes it possible to suppress the breakage of the crystal grain boundaries when the stress is applied.

Further, when the R-M-rich phase exists in the crystal grain boundaries of the sintered compact, the displacement of the crystal grain boundaries at the time of sintering is suppressed, which can suppress the crystal grains from becoming too coarse. It is said that the Hall-Petch relation holds between a crystal grain size and strength of the sintered compact, and preventing the crystal grains from becoming too coarse results in an improvement in the strength. The R-M-rich phase also functions as the pinning site of the dislocation, and from this point of view as well, the R-M-rich phase is thought to contribute to the improvement in the strength of the sintered magnet. Based on these causes, by making an appropriate amount of the R-M-rich phase exist in the crystal grain boundaries of the sintered compact, it is possible to improve the strength of the Sm—Co based sintered magnet.

The volume fraction of the R-M-rich phase existing in the sintered magnet is set to 15% or less in order to suppress the deterioration of the magnetic property. The volume fraction of the R-M-rich phase is more preferably 10% or less. However, when the volume fraction of the R-M-rich phase is too low, it is not possible to sufficiently obtain the effect of improving the strength of the sintered compact, and therefore, the volume fraction of the R-M-rich phase is set to 0.2% or more. The volume fraction of the R-M-rich phase is more preferably 0.3% or more, and still more preferably 0.5% or more. An average grain size of the crystal grains forming the sintered compact is preferably in a range of from 35 μm to 200 μm. When the average grain size of the crystal grains is over 200 μm, the strength of the sintered magnet is likely to lower. When the R-M-rich phase exists in the crystal grain boundaries, the crystal grains are prevented from becoming too coarse and the average grain size of the crystal grains can be 200 μm or less. However, the crystal grain boundaries are possible to become reversal nuclei of the magnetization. When the crystal grain size is too small, the crystal grain boundaries increase, and accordingly the coercive force and squareness tend to lower. Therefore, the average grain size of the crystal grains is preferably 35 μm or more.

A relation between the appearance of the R-M-rich phase and the magnetic property in the Sm—Co-based sintered magnet will be described in detail. The Sm—Co-based sintered magnet is fabricated in such a manner that raw materials such as Sm and Co are melted to form an alloy ingot, the alloy ingot is ground and the resultant powder is sintered after being compression-molded in a magnetic field. In order for a good magnetic property, especially the coercive force to be exhibited, it is important to obtain a single phase of the 1-7 phase in a solution heat treatment step that follows the sintering step. The alloy ingot includes various phases (hetero phases) other than the 2-17 phase being the main phase as shown in a SEM-reflected electron image in FIG. 1. The hetero phases are more easily precipitated as the Fe concentration is higher, and in particular, a large amount of a hetero phase (the R-M-rich phase/in FIG. 1, a Sm—Zr-rich phase is shown as a typical example of the R-M-rich phase) in which the concentration of the element R such as Sm and the concentration of the element M such as Zr are higher than those of the main phase is likely to be generated.

Figure 2:
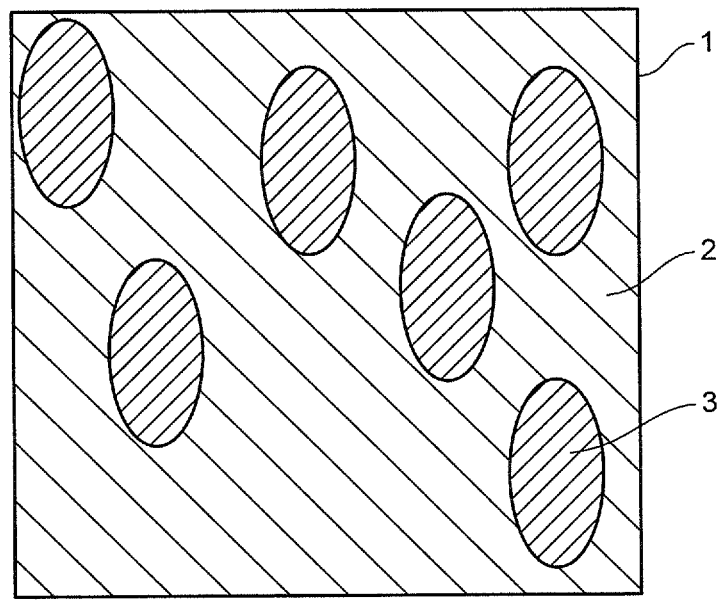
FIG. 2 is a cross-sectional view schematically showing the metallic structure of the alloy ingot shown in FIG. 1.

The hetero phases such as the R-M-rich phase are preferably erased at the time of the sintering and at the time of the solution heat treatment, in view of the appearance of the coercive force, but in conventional manufacturing processes, it has not been possible to control the generation and the erasure of the hetero phases. As a result of careful studies regarding causes thereof, the present inventors have found out that the particle size of the powder obtained by grounding the alloy ingot is correlated with a generation amount of the hetero phases. The grinding step to the sintering step of the alloy ingot will be described with reference to FIG. 2 to FIG. 6. FIG. 2 schematically shows a metallic structure of an alloy ingot 1. As shown in FIG. 2, the metallic structure of the alloy ingot 1 has a main phase 2 and hetero phases such as an R-M-rich phase 3.

Figure 5:
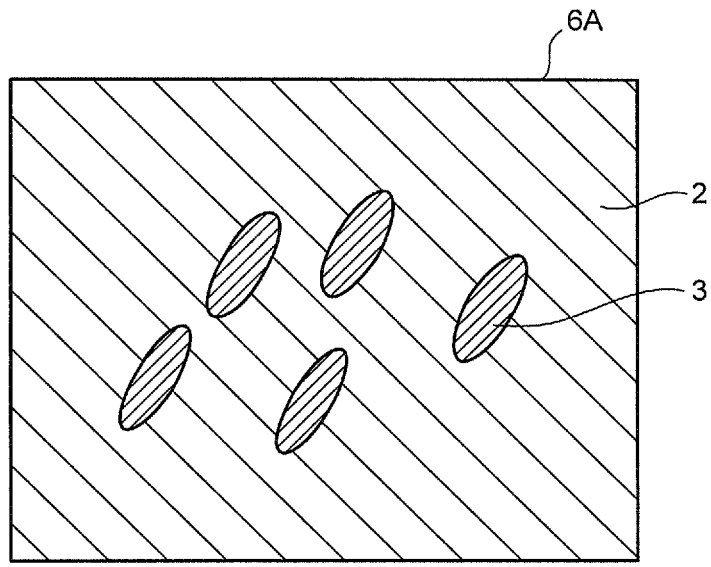
FIG. 5 is a cross-sectional view schematically showing a metallic structure of a sintered magnet fabricated by using the alloy particles shown in FIG. 3.
Figure 6:
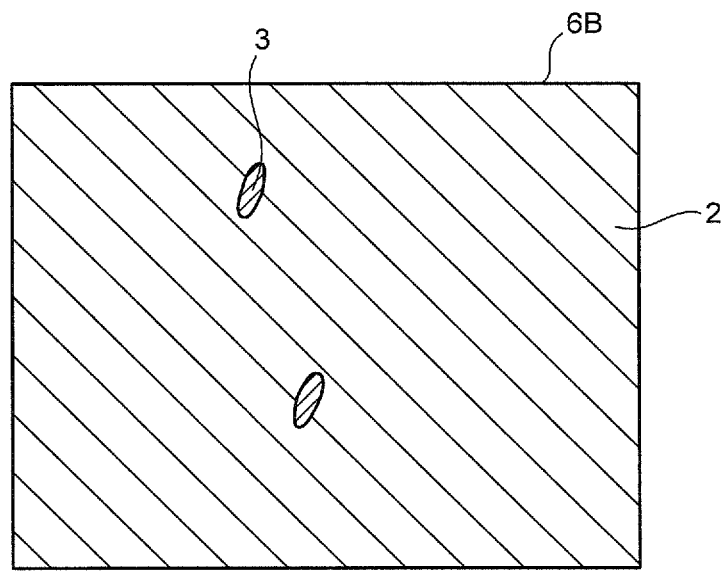
FIG. 6 is a cross-sectional view schematically showing a metallic structure of a sintered magnet fabricated by using the alloy particles shown in FIG. 4.

When the alloy ingot 1 is ground so that the particle size becomes about 20 μm (or more), alloy powder 4A has particles 5A each in a two-phase state of the main phase 2 and the R-M-rich phase 3, as shown in FIG. 3. On the other hand, when the alloy ingot 1 is ground so that the particle size becomes about 10 μm or less, alloy powder 4B becomes in a state where single-phase particles 5B of the main phase 2 and single-phase particles 5C of the R-M-rich phase 3 are mixed, as shown in FIG. 4. When the alloy powder 4A as shown in FIG. 3 is sintered, a relatively large amount of the R-M-rich phase 3 appears in a sintered compact 6A as shown in FIG. 5. When the alloy powder 4B as shown in FIG. 4 is sintered, though the R-M-rich phase 3 appears in a sintered compact 6B, its amount greatly reduces, as shown in FIG. 6. When a large amount of the R-M-rich-phase 3 is generated in the sintered compact 6A, the element M (Zr or the like) in the main phase 2 tends to be lacking. In a composition range with a high Fe concentration, the 2-17 phase tends to stabilize in the sintering step and the solution heat treatment step, and this is thought to be one of reasons why a sufficient coercive force is not exhibited on the high Fe-concentration side.

A possible reason why the 2-17 phase stabilizes when the Fe concentration increases is that the number of Fe—Fe dumbbell pairs increases, so that an amount of Fe entering an R site increases. It is expected that the Fe—Fe dumbbell pair is larger in size in a c-axis direction than the element R such as Sm. Substituting the Fe—Fe dumbbell pair for the element R is thought to increase a distortion amount in the c-axis direction. It is inferred that, in order to alleviate this distortion, the regularly substituted 2-17 phase stabilizes more than the 1-7 phase in which the Fe—Fe dumbbell pairs irregularly enter the R site. Since a radius of atoms of the element M such as Zr is larger than those of Co and Fe, it is expected that the element M is substituted for by the R site. However, since the size of the R site in the c-axis direction is smaller than that of the Fe—Fe dumbbell pairs, it is inferred that substituting the element M for the Fe—Fe dumbbell pairs makes it possible to suppress the stabilization of the 2-17 phase in the high Fe concentration range due to the increase of the Fe—Fe dumbbell pairs and to form the 1-7 phase in the solution heat treatment with good reproducibility.

By thus suppressing the generation of the R-M-rich phase whose M concentration is higher than that of the main phase and ensuring the sufficient M concentration in the main phase, it is expected that a high coercive force is exhibited in the composition range with a high Fe concentration. That is, if the M concentration in the main phase can be sufficiently ensured in a composition having a 25 at % Fe concentration or more, which has been difficult in the conventional manufacturing processes, it is possible for the high coercive force to be exhibited. A generation amount of the R-M-rich phase in the sintered compact is influenced by the particle size of the raw material powder (alloy powder) as described above. When the alloy powder 4B in which the single-phase particles 5B of the main phase 2 and the single-phase particles 5C of the R-M-rich phase 3 are mixed as shown in FIG. 4 is sintered, a uniform metallic structure is obtained since the diffusion of the elements easily progresses. On the other hand, when the alloy powder 4A having the two-phase particles 5A of the main phase 2 and the R-M-rich phase 3 as shown in FIG. 3 is sintered, it is expected that the diffusion is difficult to progress since a diffusion distance for uniformity is longer than that of the alloy powder 4B shown in FIG. 4. Further, it is expected that the R-M-rich phases 3 in the particles 5A stabilize to remain even after the sintering.

That is, by adjusting the particle size of the alloy powder used as the raw material powder of the sintered compact, it is possible to control a generation state of the R-M-rich phase. Concretely, by adjusting a ratio of alloy particles facilitating the progress of the diffusion of the elements and the alloy particles facilitating the generation of the R-M-rich phase, it is possible to obtain a sintered compact having an appropriate amount of the R-M-rich phase. Further, applying the solution heat treatment and the aging to such a sintered compact makes it possible to obtain a sintered magnet in which the volume fraction of the R-M-rich phase in the metallic structure is in the range of from 0.2% to 15%. Such a sintered magnet is not only excellent in the magnetic properties such as the magnetization and the coercive force but also is excellent in the mechanical property such as the strength. Therefore, it is possible to greatly enhance practicability of the Sm—Co based sintered magnet. Incidentally, the particle size of the alloy powder used as the raw material powder of the sintered compact will be described in detail later.

In the permanent magnet of this embodiment, the Fe concentration, the R concentration (Sm concentration and the like), the M concentration (Zr concentration and the like), and so on in the main phase and in the R-M-rich phase can be measured by SEM-EDX (SEM-Energy Dispersive X-ray Spectroscopy). The SEM-EDX observation is conducted for an interior of the sintered compact. The measurement of the interior of the sintered compact is as follows. First, the composition is measured in a surface portion and the interior of a cross section cut at a center portion of the longest side in a surface having the largest area, perpendicularly to the side (perpendicularly to a tangent of the center portion in a case of a curve).

Measurement points are as follows. Reference lines 1 drawn from ½ positions of respective sides in the aforesaid cross section as starting points up to end portions toward an inner side perpendicularly to the sides and reference lines 2 drawn from centers of respective corners as starting points up to end portions toward the inner side at ½ positions of interior angles of the corners are provided, and 1% positions of the lengths of the reference lines from the starting points of these reference lines 1, 2 are defined as the surface portion and 40% positions thereof are defined as the interior. Note that, when the corners have curvature because of chamfering or the like, points of intersection of extensions of adjacent sides are defined as the end portions (centers of the corners). In this case, the measurement points are positions determined not based on the points of intersection but based on portions in contact with the reference lines.

When the measurement points are decided as above, in a case where the cross section is, for example, a quadrangular, the number of the reference lines is totally eight, with the four reference lines 1 and the four reference lines 2, and the number of the measurement points is eight in each of the surface portion and the interior. In this embodiment, the eight points in each of the surface portion and the interior all preferably have the composition within the aforesaid range, but at least four points or more in each of the surface portion and the interior need to have the composition within the aforesaid range. In this case, a relation between the surface portion and the interior of one reference line is not defined.

The SEM observation with a magnification of ×2500 is conducted after an observation surface of the interior of the sintered compact thus defined is smoothed by polishing. An acceleration voltage is desirably 20 kV. Observation points of the SEM-EDX observation are arbitrary 20 points in the crystal grains, and an average value of measurement values at these points is found, and this average value is set as the concentration of each element.

The volume fraction of the R-M-rich phase is defined by an area ratio of the R-M-rich phase in a field of view observed by EPMA (Electron Probe Micro Analyser). The area ratio of the R-M-rich phase is found in the following manner. First, a BSE image (reflected electron image) with a magnification of ×2500 is photographed by EPMA of a field emission (FE) type. After a specific contrast is extracted from the photographed image by using two threshold values by image analysis software or the like available on the market, an area is calculated. The extraction of the contrast means that two certain "threshold values" are set for brightness (lightness) of each pixel of the image, and a region is discriminated in such a manner that "0" is set when the brightness is equal to or less than the threshold value A or equal to or more than the threshold value B, and "1" is set when the brightness is equal to or more than the threshold value A and equal to or less than the threshold value B. As the threshold values, the minimum values of brightness to be extracted on both sides of its distribution are used, and this region is selected. When the distribution of the brightness overlaps with another contrast, the minimum values of the both brightnesses are used as the threshold values, and this region is selected.

The average grain size of the crystal grains forming the sintered compact (sintered magnet) (average crystal grain size) can be measured by SEM-EBSP (SEM-Electron Backscattering Pattern). The procedure for finding the average grain area and the average grain size of the crystal grains existing in the measurement area will be shown below. First, as a pre-process, a sample is embedded in epoxy resin, mechanically polished, and subjected to buffed finish, followed by water washing and water spraying by air-blow. The sample having undergone the water spraying is surface-treated by a dry etching apparatus. Next, a surface of the sample is observed by a scanning electron microscope S-4300SE (manufactured by Hitachi High Technologies, Inc.) to which EBSD system-Digiview (manufactured by TSL Corporation) is attached. As observation conditions, the acceleration voltage is 30 kV and the measurement area is 500 μm×500 μm. From observation results, the average grain area and the average grain size of the crystal grains existing in the measurement area are found under the following condition.

Orientations of all the pixels in the measurement area range are measured with a 2 μm step size, and a boundary where an orientation error between the adjacent pixels is 5° or more is regarded as the crystal grain boundary. However, a crystal grain where the number of measurement points included in the same crystal grain is less than five and a crystal grain reaching an end portion of the measurement area range are not regarded as the crystal grains. The grain area is an area in the same crystal grain surrounded by the crystal grain boundary, and the average grain area is an average value of the areas of the crystal grains existing in the measurement area range. The grain size is a diameter of a complete circle having the same area as the area in the same crystal grain, and the average grain size is an average value of the grain sizes of the crystal grains existing in the measurement area range.

The permanent magnet of this embodiment is fabricated as follows, for instance. First, alloy powder containing predetermined amounts of elements is fabricated. The alloy powder is prepared by forming an alloy ingot obtained through the forging of molten metal melted by, for example, an arc melting method or a high-frequency melting method and grinding the alloy ingot. Other examples of the method of preparing the alloy powder are a strip cast method, a mechanical alloying method, a mechanical grinding method, a gas atomization method, a reduction diffusion method, and the like. The alloy powder prepared by any of these methods may be used. The alloy powder thus obtained or the alloy before being ground may be heat-treated for homogenization when necessary. A jet mill, a ball mill, or the like is used for grinding the flake or the ingot. The grinding is preferably performed in an inert gas atmosphere or an organic solvent in order to prevent oxidization of the alloy powder.

As described above, the particle size of the alloy powder (particle size after the grinding) influences the metallic structure of the sintered compact, and as a result, it also influences the magnetic property and the strength of the sintered magnet. Concretely, the alloy powder preferably contains particles whose particle size is 3 μm or more and less than 7 μm in an amount of 80 vol % or more, and particles whose particle size is 7 μm or more and less than 15 μm in an amount of from 1 vol % to 10 vol %. The sintered compact is fabricated by using the alloy powder having such particle size distribution, and such a sintered compact is subjected to the later-described solution heat treatment and aging, so that it is possible to obtain the sintered magnet including the metallic structure having the main phase including the $Th_2Zn_{17}$ crystal phase, and the R-M-rich phase whose volume fraction is in the range of from 0.2% to 15%.

When most (80 vol % or more) of the alloy powder are the particles whose particle size is 3 μm or more and less than 7 μm, and the particles whose particle size is 7 μm or more and less than 15 μm are contained therein in the range of from 1 vol % to 10 vol %, it is possible to precipitate an appropriate amount of the R-M-rich phase in the sintered compact. When an amount of the particles whose particle size is 7 μm or more and less than 15 μm is too large, a precipitation amount of the R-M-rich phase increases, and on the other hand, when its amount is too small, it is not possible to precipitate an effective amount of the R-M-rich phase. In the alloy powder, a ratio of the particles whose particle size is 3 μm or more and less than 7 μm is preferably 85 vol % or more, and more preferably 95 vol % or more. In consideration of an amount of the particles whose particle size is 7 μm or more and less than 15 μm, the ratio of the particles whose particle size is 3 μm or more and less than 7 μm is preferably 98 vol % or less. The ratio of the particles whose particle size is 7 μm or more and less than 15 μm is more preferably 5 vol % or less, and still more preferably 3 vol % or less.

For example, when a sintered compact is fabricated by using alloy powder containing only particles with a 15 μm or more of particle size at a sintering temperature of 1160° C. to 1220° C., an obvious R-M-rich phase precipitates in the sintered compact and a sufficient sintered density cannot be obtained either. When alloy powder containing only particles whose particle size is less than 7 μm is used, a sintered compact having a sufficient density is obtained, and almost no generation of the R-M-rich phase is recognized. The same applies also to a case where alloy powder containing only particles whose particle size is less than 3 μm is used, but an oxygen concentration in the sintered compact tends to be high. When the oxygen concentration is high, the magnetization and the coercive force both liable to lower. When alloy powder containing only particles whose particle size is 7 or more and less than 15 μm is used, an amount of the R-M-rich phase decreases.

As a result of evaluating the volume fraction of the R-M-rich phase in each of the aforesaid sintered compacts based on a SEM-reflected electron image, the volume fraction was over 15% when the alloy powder containing only the particles with a 15 μm particle size or more was used, and was 0.1% when the alloy powder containing only the particles whose particle size was 3 μm or more and less than 7 μm was used. On the other hand, when alloy powder containing about several % particles whose particle size is 7 μm or more and less than 15 μm while mainly containing particles whose particle size is 3 μm or more and less than 7 μm is used, the volume fraction of the R-M-rich phase in the sintered compact becomes an appropriate amount. That is, the volume fraction of the R-M-rich phase can be in the range of from 0.2% to 15%.

As a result of evaluating the average crystal grain size of each of the sintered compacts by SEM-EBSP, it was about 30 μm when the alloy powder containing only the particles with a 15 μm particle size or more was used, and it was over 200 μm when the alloy powder containing only the particles whose particle size was 3 μm or more and less than 7 μm was used. On the other hand, when the alloy powder containing about several % particles whose particle size is 7 μm or more and less than 15 μm while mainly containing the particles whose particle size is 3 μm or more and less than 7 μm is used, the average crystal grain size of the sintered compact becomes in the range of from 35 μm to 200 μm. The sintered magnet made of the sintered compact having such an average crystal grain size exhibits good strength, and its coercive force and residual magnetization also have good values.

Next, the alloy powder is filled in a mold installed in an electromagnet or the like and it is press-formed while a magnetic field is applied, whereby a compression-molded body whose crystal axis is oriented is fabricated. By sintering this compression-molded body under an appropriate condition, it is possible to obtain a sintered compact having a high density. The compression-molded body is preferably sintered in a vacuum atmosphere or an atmosphere of inert gas such as argon gas. Further, it is also effective to employ the combination of the sintering in the vacuum atmosphere and the sintering in the inert gas atmosphere. In this case, it is preferable to first sinter the compression-molded body in the vacuum atmosphere and next sinter the temporarily sintered compact in the inert gas atmosphere. For example, it is preferable that the vacuum atmosphere of $9 \times 10^{-2}$ Pa or less is kept until the temperature becomes close to a sintering temperature, and thereafter the sintering is performed in the inert gas atmosphere. By such a sintering step, it is possible to obtain a sintered compact with a high density. When a degree of vacuum of the vacuum atmosphere is over $9 \times 10^{-2}$ Pa, an oxide of Sm or the like is excessively formed and the magnetic property deteriorates.

The sintering temperature of the compression-molded body is preferably 1215° C. or lower. When the Fe concentration is high, it is expected that a melting point becomes lower, and therefore when the sintering temperature is too high, the evaporation of Sm or the like is likely to occur. The sintering temperature is more preferably 1205° C. or lower, and still more preferably 1195° C. or lower. However, in order to increase the density of the sintered compact, the sintering temperature is preferably 1170° C. or higher, and more preferably 1180° C. or higher. The retention time at the sintering temperature is preferably 0.5 hours to fifteen hours. This makes it possible to obtain a dense sintered compact. When the sintering time is less than 0.5 hours, the density of the sintered compact becomes non-uniform. Further, when the sintering time is over fifteen hours, it may not be possible to obtain a good magnetic property due to the evaporation of Sm or the like in the alloy powder. The sintering time is more preferably one hour to ten hours, and still more preferably one hour to four hours. The main sintering step is executed in the atmosphere of the inert gas such as Ar gas.

Next, the solution heat treatment and the aging are applied to the obtained sintered compact to control the crystal structure. The solution heat treatment is preferably 0.5-hour to twenty-hour heat treatment at a temperature within a range of 1100° C. to 1200° C. in order to obtain the 1-7 phase being the precursor of the phase separation structure. When the temperature is lower than 1100° C. or is over 1200° C., a ratio of the 1-7 phase in the sample after the solution heat treatment is small, and a good magnetic property cannot be obtained. The temperature of the solution heat treatment is more preferably within a range of 1120° C. to 1190° C., and still more preferably within a range of 1120° C. to 1180° C. When the time of the solution heat treatment is less than 0.5 hours, the constituent phase is likely to be non-uniform, and when it is over twenty hours, Sm or the like in the sintered compact evaporates and a good magnetic property may not be obtained. The time of the solution heat treatment is more preferably within a range of two hours to sixteen hours, and still more preferably within a range of four hours to twelve hours. The solution heat treatment is preferably conducted in a vacuum atmosphere or an atmosphere of inert gas such as argon gas in order to prevent the oxidization.

Next, the sintered compact having undergone the solution heat treatment is subjected to the aging. The aging is a process to control the crystal structure and increase the coercive force of the magnet. The aging is preferably performed by the four- to eighty-hour retention at a temperature of 700° C. to 900° C., followed by gradual cooling to a temperature of 300° C. to 650° C. at a cooling rate of 0.2° C./minute to 2° C./minute, and subsequent cooling to room temperature by furnace cooling. The aging may be performed by two-stage heat treatment. For example, the aforesaid heat treatment is the first stage, and thereafter, as the second-stage heat treatment, after the sintered compact is kept at 300° C. to 650° C. temperature for a predetermined time, it is subsequently cooled to room temperature by furnace cooling. The aging is preferably performed in a vacuum atmosphere or an inert gas atmosphere in order to prevent the oxidization.

When the aging temperature is lower than 700° C. or is higher than 900° C., it is not possible to obtain a uniform mixed structure of the cell phase and the cell wall phase, which is liable to lower the magnetic property of the permanent magnet. The aging temperature is more preferably 750° C. to 880° C., and still more preferably 780° C. to 860° C. When the aging time is less than four hours, the precipitation of the cell wall phase from the 1-7 phase may not be completed sufficiently. On the other hand, when the aging time is over eighty hours, a thickness of the cell wall phase becomes large, resulting in a reduction in the volume fraction of the cell phase, or the crystal grains become coarse, so that a good magnetic property may not be obtained. The aging time is more preferably six hours to sixty hours, and still more preferably eight hours to forty-five hours.

When the cooling rate after the aging heat treatment is less than 0.2° C./minute, the thickness of the cell wall phase becomes large, resulting in a reduction in the volume fraction of the cell phase, or the crystal grains become coarse, so that a good magnetic property may not be obtained. When the cooling rate after the aging heat treatment is over 2° C./minute, it is not possible to obtain a uniform mixed structure of the cell phase and the cell wall phase, so that the magnetic property of the permanent magnet is liable to deteriorate. The cooling rate after the aging heat treatment is more preferably within a range of 0.4° C./minute to 1.5° C./minute, and still more preferably within a range of 0.5° C./minute to 1.3° C./minute.

Note that the aging is not limited to the two-stage heat treatment and may be a more multiple-stage heat treatment, and performing multiple-stage cooling is also effective. Further, as a pre-process of the aging, it is also effective to perform preliminary aging at a lower temperature for a shorter time than those of the aging. Consequently, it is expected that the squareness of a magnetization curve is improved. Concretely, when a temperature of the preliminary aging is set to 650° C. to 790° C., the treatment time is set to 0.5 hours to four hours, and the gradual cooling rate after the aging is set to 0.5° C./minute to 1.5° C./minute, it is expected that the squareness of the permanent magnet is improved.

The permanent magnet of this embodiment is usable in various kinds of motors and power generators. The permanent magnet of the embodiment is also usable as a stationary magnet and a variable magnet of a variable magnetic flux motor and a variable magnetic flux power generator. Various kinds of motors and power generators are structured by the use of the permanent magnet of this embodiment. When the permanent magnet of this embodiment is applied to a variable magnetic flux motor, arts disclosed in Japanese Patent Application Laid-open No. 2008-29148 and Japanese Patent Application Laid-open No. 2008-43172 are applicable as a structure and a drive system of the variable magnetic flux motor.

Figure 7:
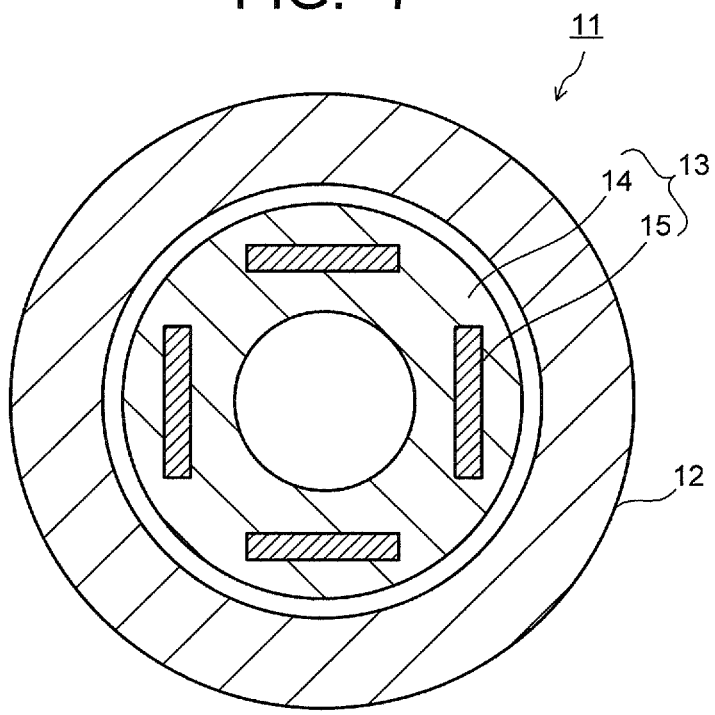
FIG. 7 is a view showing a permanent magnet motor of an embodiment.

Next, a motor and a power generator of embodiments will be described with reference to the drawings. FIG. 7 shows a permanent magnet motor according to an embodiment. In the permanent magnet motor 11 shown in FIG. 7, a rotor (rotating part) 13 is disposed in a stator (stationary part) 12. In an iron core 14 of the rotor 13, the permanent magnets 15 of the embodiment are disposed. Based on the properties and so on of the permanent magnets of the embodiment, it is possible to realize efficiency enhancement, downsizing, cost reduction, and so on of the permanent magnet motor 11.

Figure 8:
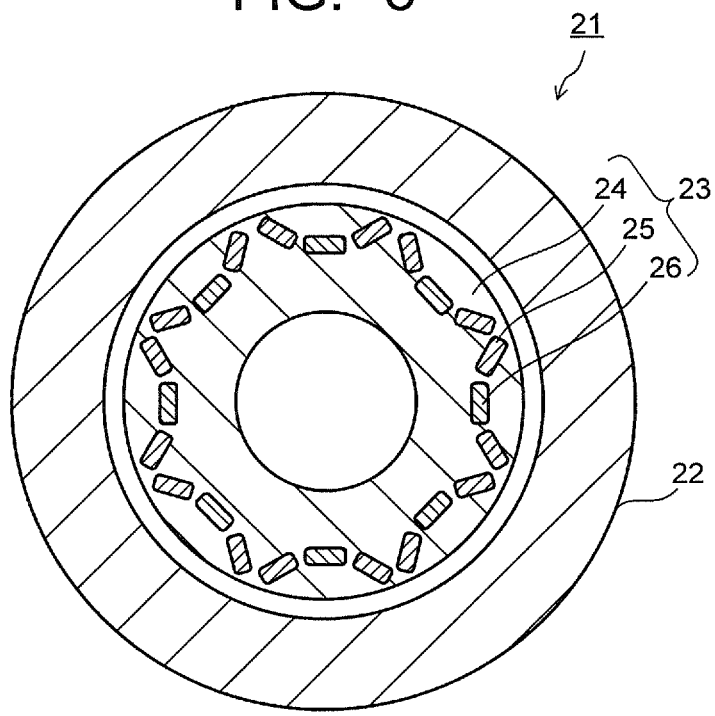
FIG. 8 is a view showing a variable magnetic flux motor of an embodiment.

FIG. 8 shows a variable magnetic flux motor according to an embodiment. In the variable magnetic flux motor 21 shown in FIG. 8, a rotor (rotating part) 23 is disposed in a stator (stationary part) 22. In an iron core 24 of the rotor 23, the permanent magnets of the embodiment are disposed as stationary magnets 25 and variable magnets 26. Magnetic flux density (flux quantum) of the variable magnets 26 is variable. The variable magnets 26 are not influenced by a Q-axis current because their magnetization direction is orthogonal to a Q-axis direction, and can be magnetized by a D-axis current. In the rotor 23, a magnetized winding (not shown) is provided. When a current is passed through the magnetized winding from a magnetizing circuit, its magnetic field acts directly on the variable magnets 26.

According to the permanent magnet of the embodiment, it is possible to obtain, for example, the stationary magnet 25 whose coercive force is over 500 kA/m and the variable magnet 26 whose coercive force is equal to or lower than 500 kA/m, by changing the various conditions of the aforesaid manufacturing method. In the variable magnetic flux motor 21 shown in FIG. 8, the permanent magnets of the embodiment are usable as both of the stationary magnets 25 and the variable magnets 26, but the permanent magnets of the embodiment may be used as either of the magnets. The variable magnetic flux motor 21 is capable of outputting a large torque with a small device size and thus is suitable for motors of hybrid vehicles, electric vehicles, and so on whose motors are required to have a high output and a small size.

Figure 9:
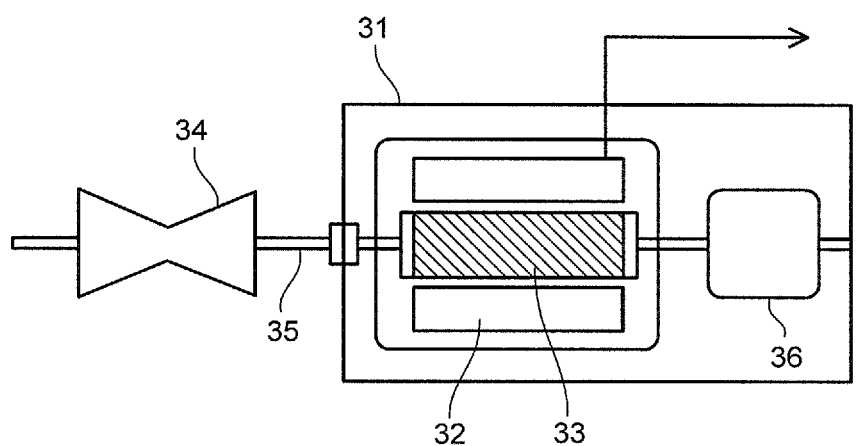
FIG. 9 is a view showing a permanent magnet power generator of an embodiment.

FIG. 9 shows a power generator according to an embodiment. The power generator 31 shown in FIG. 9 includes a stator (stationary part) 32 using the permanent magnet of the embodiment. A rotor (rotating part) 33 disposed inside the stator (stationary part) 32 is connected via a shaft 35 to a turbine 34 provided at one end of the power generator 31. The turbine 34 rotates by an externally supplied fluid, for instance. Incidentally, instead of the turbine 34 rotating by the fluid, it is also possible to rotate the shaft 35 by the transmission of dynamic rotation such as regenerative energy of a vehicle. As the stator 32 and the rotor 33, various kinds of generally known structures are adoptable.

The shaft 35 is in contact with a commutator (not shown) disposed on the rotor 33 opposite the turbine 34, and an electromotive force generated by the rotation of the rotor 33 is boosted to system voltage to be transmitted as an output of the power generator 31 via an isolated phase bus and a traction transformer (not shown). The power generator 31 may be either of an ordinary power generator and a variable magnetic flux power generator. Incidentally, the rotor 33 is electrically charged due to static electricity from the turbine 34 or an axial current accompanying the power generation. Therefore, the power generator 31 includes a brush 36 for discharging the charged electricity of the rotor 33.

Next, examples and their evaluation results will be described.

Examples 1, 2

Raw materials were weighed so that the compositions became as shown in Table 1, and the resultants were high-frequency-melted in an Ar gas atmosphere, whereby alloy ingots were fabricated. The alloy ingots were roughly ground and then finely ground by a jet mill, whereby alloy powders were prepared. By adjusting conditions of the grinding by the jet mill, the alloy powders having particle size distributions shown in Table 2 were obtained. The alloy powders were press-formed in a magnetic field, whereby compression-molded bodies were fabricated. Next, the compression-molded bodies of the alloy powders were each disposed in a chamber of a firing furnace, temperature thereof was increased up to 1200° C. in an Ar gas atmosphere, and they were sintered while kept at this temperature for six hours, and subsequently were subjected to solution heat treatment while kept at 1180° C. for five hours.

Next, sintered compacts after the solution heat treating were kept at 720° C. for three hours, thereafter were gradually cooled to room temperature, and were further kept at 840° C. for twenty hours. The sintered compacts having undergone aging under such a condition were gradually cooled to 400° C. and were further furnace-cooled to room temperature, whereby aimed sintered magnets were obtained. The compositions of the sintered magnets are as shown in Table 1. Composition analysis of the magnets was conducted by an ICP (Inductively Coupled Plasma) method. Following the aforesaid method, a volume fraction of an R-M-rich phase in each of the sintered magnets (sintered compacts) and an average crystal grain size of each of the sintered magnets (sintered compacts) were found. Magnetic properties of the sintered magnets were evaluated by a BH tracer and their coercive force and residual magnetization were measured. Further, deflective strength of each of the sintered magnets (sintered compacts) was measured according to the method shown below. Measurement results thereof are shown in Table 3.

Note that the composition analysis by the ICP method was done in the following procedure. First, samples taken from the aforesaid measurement points are ground in a mortar, and a predetermined amount of each of the samples is weighed and is put into a quartz beaker. A mixed acid (containing nitric acid and hydrochloric acid) is put into the quartz beaker, which is heated to about 140° C. on a hotplate, whereby the samples are completely melted. After they are left standing to cool, they are each transferred to a PFA volumetric flask and their volumes are determined to produce sample solutions. Quantities of components of such sample solutions are determined by a calibration curve method with the use of an ICP emission spectrochemical analyzer. As the ICP emission spectrochemical analyzer, SPS4000 (trade name) manufactured by SII Nano Technology Inc. was used.

Mechanical strength of the sintered compacts was evaluated by measuring the deflective strength σb3 by using a three-point bending testing machine. The measured samples are fabricated according to the JIS Standard in such a manner that bar-shaped test pieces with a 4.0 mm width×a 3.0 mm thickness×a 47 mm length are cut out from each of the sintered compact samples having undergone the aging. Five bar-shaped samples are cut out from the same block as much as the situation allows. If it is difficult to cut them out, five pieces are prepared by being cut out from sintered compacts fabricated under the same condition. Sample surfaces are polished by sandpaper of about #400 to be brought into a state where no obvious scratch is seen. An interfulcrum distance is set to 40 mm and a load application rate is set to 0.5 mm/minute. The test is conducted at room temperature. For the measurement, a three-point bending testing machine Rin-MICI-07 (manufactured by Matsuzawa-sha) is used, for instance. An average value of measurement values of the five samples is defined as the deflective strength σb3.

Examples 3 to 5

Raw materials were weighed so that the compositions became as shown in Table 1, and the resultants were arc-melted in an Ar gas atmosphere, whereby alloy ingots were fabricated. The alloy ingots were roughly ground after heat-treated under a condition of 1180° C.×four hours, and then finely ground by a jet mill, whereby alloy powders were prepared. By adjusting conditions of the grinding by the jet mill, the alloy powders having particle size distributions shown in Table 2 were obtained. The alloy powders were press-formed in a magnetic field, whereby compression-molded bodies were fabricated. Next, the compression-molded bodies of the alloy powders were each disposed in a chamber of a firing furnace, and the chamber was vacuumed until a degree of vacuum therein became $9.5 \times 10^{-3}$ Pa. In this state, the temperature in the chamber was increased to 1160° C., and the chamber was kept at this temperature for five minutes, and thereafter, Ar gas was led into the chamber. The temperature in the chamber whose atmosphere became an Ar atmosphere was increased to 1185° C., sintering was performed while the chamber was kept at this temperature for three hours, and subsequently solution heat treatment was performed while the chamber was kept at 1140° C. for twelve hours.

Next, sintered compacts after the solution heat treating were kept at 750° C. for two hours, thereafter were gradually cooled to room temperature, and were further kept at 805° C. for forty hours. The sintered compacts having undergone aging under such a condition were gradually cooled to 400° C. and were further furnace-cooled to room temperature, whereby aimed sintered magnets were obtained. The compositions of the sintered magnets are as shown in Table 1. A volume fraction of an R-M-rich phase in each of the sintered magnets, and an average crystal grain size, a coercive force, residual magnetization, and deflective strength of each of the sintered magnets were measured in the same manners as those of the example 1. Measurement results thereof are shown in Table 3.

Examples 6 to 8

Raw materials were weighed so that the compositions became as shown in Table 1, and the resultants were high-frequency-melted in an Ar gas atmosphere, whereby alloy ingots were fabricated. The alloy ingots were roughly ground after heat-treated under a condition of 1160° C.×eight hours, and then finely ground by a jet mill, whereby alloy powders were prepared. By adjusting conditions of the grinding by the jet mill, the alloy powders having particle size distributions shown in Table 2 were obtained. The alloy powders were press-formed in a magnetic field, whereby compression-molded bodies were fabricated. Next, the compression-molded bodies of the alloy powders were each disposed in a chamber of a firing furnace, were increased in temperature up to 1195° C. in an Ar gas atmosphere, were sintered while kept at this temperature for three hours, and subsequently were subjected to solution heat treatment while kept at 1150° C. for twelve hours.

Next, the sintered compacts having undergone the solution heat treatment were kept at 690° C. for four hours, thereafter were gradually cooled to room temperature, and were further kept at 850° C. for twenty hours. The sintered compacts having undergone aging under such a condition were gradually cooled to 350° C. and were further furnace-cooled to room temperature, whereby aimed sintered magnets were obtained. The compositions of the sintered magnets are as shown in Table 1. A volume fraction of an R-M-rich phase in each of the sintered magnets, and an average crystal grain size, a coercive force, residual magnetization, and deflective strength of each of the sintered magnets were measured in the same manners as those of the example 1. Measurement results thereof are shown in Table 3.

Comparative Examples 1 and 2

Sintered magnets were fabricated in the same manner as that of the example 1 except that the compositions shown in Table 1 were employed. In a comparative example 1, a Fe concentration in the alloy composition is set to less than 25 at %, and in a comparative example 2, a Sm concentration in the alloy composition is set to less than 10 at %. A volume fraction of an R-M-rich phase in each of the sintered magnets, and an average crystal grain size, a coercive force, residual magnetization, and deflective strength of each of the sintered magnets were measured in the same manners as those of the example 1. Measurement results thereof are shown in Table 3.

Comparative Examples 3 to 4

Raw materials were weighed so that the compositions became the same as that of the example 6, and the resultants were high-frequency-melted in an Ar gas atmosphere, whereby alloy ingots were fabricated. The alloy ingots were roughly ground after heat-treated under a condition of 1160° C.×eight hours, and then finely ground by a jet mill, whereby alloy powders were prepared. By adjusting conditions of the grinding by the jet mill, the alloy powders having particle size distributions shown in Table 2 were obtained. A comparative example 3 uses alloy powder not containing particles with a 7 µm to 15 µm particle size, and a comparative example 4 uses alloy powder having a large amount of gains with a 7 µm to 15 µm particle size. Sintered magnets were fabricated in the same manner as that of the example 6 except that such alloy powders were used. A volume fraction of an R-M-rich phase in each of the sintered magnets, and an average crystal grain size, a coercive force, residual magnetization, and deflective strength of each of the sintered magnets were measured in the same manners as those of the example 1. Measurement results thereof are shown in Table 3.

TABLE 1

| | Magnet Composition (at %) |
|---|---|
| Example 1 | $(Sm_{0.95}Nd_{0.05})_{10.99}Fe_{25.37}Zr_{1.87}Cu_{6.23}Co_{55.54}$ |
| Example 2 | $Sm_{11.90}Fe_{26.44}(Zr_{0.85}Ti_{0.15})_{1.76}Cu_{7.22}Co_{52.68}$ |
| Example 3 | $Sm_{10.75}Fe_{30.17}Zr_{1.70}Cu_{5.26}(Co_{0.998}Cr_{0.002})_{52.12}$ |
| Example 4 | $Sm_{11.24}Fe_{31.06}Zr_{1.60}Cu_{5.24}Co_{50.86}$ |
| Example 5 | $Sm_{11.36}Fe_{27.83}Zr_{1.68}Cu_{5.05}(Co_{0.998}Cr_{0.002})_{54.08}$ |
| Example 6 | $Sm_{10.99}Fe_{25.81}(Zr_{0.95}Ti_{0.05})_{1.87}Cu_{5.16}Co_{56.17}$ |
| Example 7 | $Sm_{10.99}Fe_{25.81}(Zr_{0.95}Ti_{0.05})_{1.87}Cu_{5.16}Co_{56.17}$ |
| Example 8 | $Sm_{10.99}Fe_{25.81}(Zr_{0.95}Ti_{0.05})_{1.87}Cu_{5.16}Co_{56.17}$ |
| Comparative Example 1 | $(Sm_{0.95}Nd_{0.05})_{10.99}Fe_{23.14}Zr_{1.87}Cu_{6.23}Co_{57.77}$ |
| Comparative Example 2 | $Sm_{9.80}Fe_{27.06}(Zr_{0.85}Ti_{0.15})_{1.80}Cu_{7.40}Co_{53.94}$ |
| Comparative Example 3 | $Sm_{10.99}Fe_{25.81}(Zr_{0.95}Ti_{0.05})_{1.87}Cu_{5.16}Co_{56.17}$ |
| Comparative Example 4 | $Sm_{10.99}Fe_{25.81}(Zr_{0.95}Ti_{0.05})_{1.87}Cu_{5.16}Co_{56.17}$ |

TABLE 2

| | Particle Size Distribution of Alloy Powder [vol %] | | | |
|---|---|---|---|---|
| | less than 3 µm | 3 µm or more and less than 7 µm | 7 µm or more and less than 15 µm | 15 µm or more |
| Example 1 | 8 | 80 | 9 | 3 |
| Example 2 | 3 | 90 | 5 | 2 |
| Example 3 | 5 | 85 | 5 | 5 |
| Example 4 | 1 | 95 | 2 | 2 |
| Example 5 | 5 | 90 | 2 | 3 |
| Example 6 | 5 | 90 | 3 | 2 |
| Example 7 | 5 | 93 | 1 | 1 |
| Example 8 | 2 | 85 | 10 | 3 |
| Comparative Example 1 | 8 | 80 | 9 | 3 |
| Comparative Example 2 | 3 | 90 | 5 | 2 |
| Comparative Example 3 | 1 | 98 | 1 | 0 |
| Comparative Example 4 | 1 | 79 | 15 | 5 |

TABLE 3

| | Sintered Compact | | | | |
|---|---|---|---|---|---|
| | Volume fraction of R-M-rich phase [%] | Average crystal grain size [μm] | Coercive force [kA/m] | Residual magnetization [T] | Deflective Strength [MPa] |
| Example 1 | 10 | 45 | 1620 | 1.14 | 100 |
| Example 2 | 2 | 62 | 1440 | 1.18 | 87 |
| Example 3 | 7 | 37 | 1190 | 1.21 | 90 |
| Example 4 | 0.8 | 105 | 1260 | 1.24 | 80 |
| Example 5 | 5 | 40 | 1210 | 1.19 | 95 |
| Example 6 | 1 | 51 | 1710 | 1.15 | 85 |
| Example 7 | 0.5 | 120 | 1740 | 1.16 | 75 |
| Example 8 | 8 | 42 | 1150 | 1.13 | 110 |
| Comparative Example 1 | 7 | 50 | 1810 | 1.10 | 90 |
| Comparative Example 2 | 1 | 46 | 650 | 1.18 | 84 |
| Comparative Example 3 | 0.1 | 210 | 1760 | 1.04 | 58 |
| Comparative Example 4 | 23 | 370 | 350 | 1.09 | 120 |

As is apparent from Table 3, it is seen that the sintered magnets of the examples 1 to 8 all have high magnetization and a high coercive force, and further values of the deflective strength are also large. According to the examples 1 to 8, it is possible to provide a sintered magnet excellent in magnetic property and mechanical property and having high practicability.

While certain embodiments have been described, these embodiments have been presented by way of example only, and are not intended to limit the scope of the inventions. Indeed, the novel methods described herein may be embodied in a variety of other forms; furthermore, various omissions, substitutions and changes in the form of the methods described herein may be made without departing from the spirit of the inventions. The accompanying claims and their equivalents are intended to cover such forms or modifications as would fall within the scope and spirit of the inventions.

What is claimed is:

1. A permanent magnet, comprising
a sintered compact including:
a composition expressed by a composition formula:

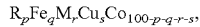

$R_p Fe_q M_r Cu_s Co_{100-p-q-r-s}$, wherein R is at least one element selected from the group consisting of rare-earth elements, M is at least one element selected from the group consisting of zirconium (Zr), titanium (Ti), and hafnium (Hf), p is a number satisfying 10≤p≤13.3 at %, q is a number satisfying 25≤q≤40 at %, r is a number satisfying 0.87≤r≤5.4 at %, and s is a number satisfying 3.5≤s≤13.5 at %; and
a metallic structure having a main phase including a $Th_2Zn_{17}$ crystal phase and containing the element R and the element M, and an R-M-rich phase containing the element R whose concentration is 1.2 times or more of an R concentration in the main phase and the element M whose concentration is 1.2 times or more of an M concentration in the main phase,
wherein a volume fraction of the R-M-rich phase in the metallic structure is 0.5% or more and 2% or less as measured by SEM-EDX (SEM-Energy Dispersive X-ray Spectroscopy) and EPMA (Electron Probe Micro Analyzer),
wherein the main phase includes a cell phase having the $Th_2Zn_{17}$ crystal phase, and a cell wall phase existing so as to surround the cell phase, and
wherein the sintered compact has crystal grains each composed of the main phase and grain boundaries of the crystal grains, and an average grain size of the crystal grains is 51 μm or more and 120 μm or less.

2. The permanent magnet according to claim 1, wherein the R-M-rich phase exists in the grain boundary.

3. The permanent magnet according to claim 1, wherein 50 at % or more of the amount of the element R in the composition formula is samarium (Sm), and 50 at % or more of the amount of the element M in the composition formula is zirconium (Zr).

4. The permanent magnet according to claim 1, wherein 20 at % or less of the amount of the cobalt (Co) in the composition formula is substituted by at least one element A selected from the group consisting of nickel (Ni), vanadium (V), chromium (Cr), manganese (Mn), aluminum (Al), gallium (Ga), niobium (Nb), tantalum (Ta), and tungsten (W).

5. A motor comprising the permanent magnet according to claim 1.

6. A power generator comprising the permanent magnet according to claim 1.

* * * * *